United States Patent [19]

McGinn

[11] 4,348,694

[45] Sep. 7, 1982

[54] HORIZONTAL PHASE DETECTOR GAIN CONTROL

[75] Inventor: Michael McGinn, Tempe, Ariz.

[73] Assignee: Motorola, Inc., Schaumberg, Ill.

[21] Appl. No.: 220,604

[22] Filed: Dec. 29, 1980

[51] Int. Cl.³ .............................................. H04N 5/04
[52] U.S. Cl. .................................... 358/158; 358/159; 358/148
[58] Field of Search ............... 358/148, 158, 159, 150; 331/1 A, 177 R

[56] References Cited

U.S. PATENT DOCUMENTS

| | | | |
|---|---|---|---|
| 3,821,470 | 6/1974 | Merrell | 358/159 |
| 3,891,800 | 6/1975 | Janssen | 358/159 |
| 4,063,133 | 12/1977 | Nero | 358/159 |
| 4,214,260 | 7/1980 | Van Straaten | 358/148 |
| 4,245,251 | 1/1981 | Steckler | 358/158 |
| 4,250,525 | 2/1981 | Steckler | 358/158 |
| 4,251,833 | 2/1981 | Fernsler | 358/148 |
| 4,253,116 | 2/1981 | Rodgers | 358/158 |

Primary Examiner—Michael A. Masinick
Attorney, Agent, or Firm—Vincent B. Ingrassia

[57] ABSTRACT

A vertical countdown circuit in a television receiver includes a vertical countdown counter from which a slot is decoded and compared in time with the counter reset signal. When the counter is locked by the incoming vertical synchronization pulse, the counter reset signal overlaps the slot resulting in a detection of vertical coincidence. When two such detections are made, a signal is applied to the phase detector in the horizontal phase lock loop to decrease its gain and thus the bandpass characteristic of the phase lock loop to provide high noise immunity. If, on the other hand, a predetermined number of counter reset signals are received which do not overlap the slot, then a signal is applied to the phase detector which increases the current therethrough to increase its gain and to increase the bandpass characteristic of the horizontal phase lock loop to provide better pull-in characteristics.

9 Claims, 4 Drawing Figures

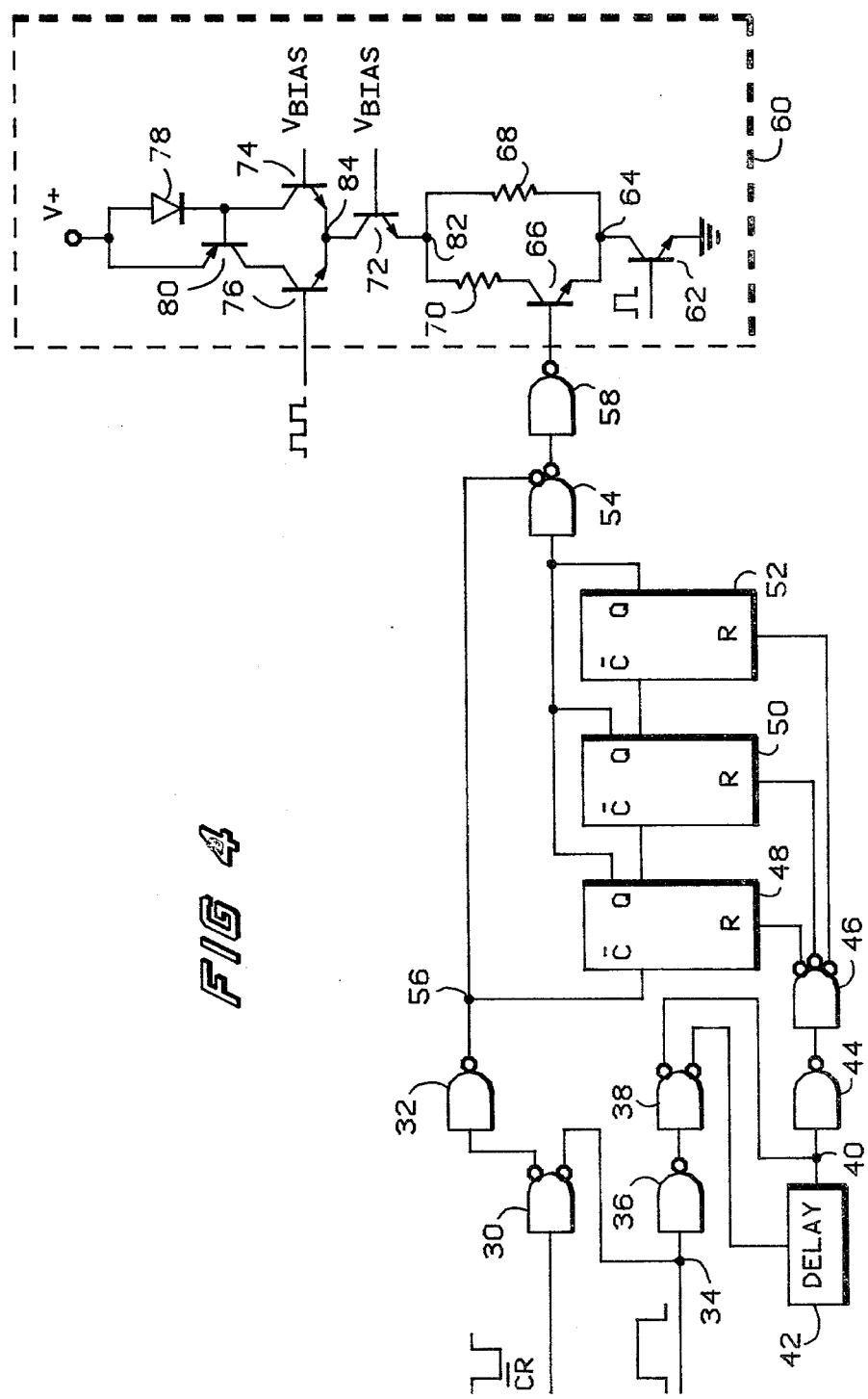

HORIZONTAL PHASE DETECTOR GAIN CONTROL

CROSS REFERENCE TO RELATED APPLICATIONS 1. 220,606 Dec. 29, 1980 "Horizontal Oscillator"
2. 220,608 Dec. 29, 1980 "Horizontal Phase Lock Loop For Television"
3. 220,328 Dec. 29, 1980 "Linear Full Wave Rectifier and Method for Providing Full Wave Rectified Signals"
4. 220,607 Dec. 29, 1980 "Large Scale, Single Chip Integrated Circuit Television Receiver Subsystem"
5. 220,609 Dec. 29, 1980 "Variable Capacitance Circuit"
6. 220,605 Dec. 29, 1980 "Crossover Circuit for Use in Automatic Gain Control Systems"
7. 220,329 Dec. 29, 1980 "Linear Full Wave Rectifier Circuit"
8. 220,611 Dec. 29, 1980 "Sync Separator"
9. 220,610 Dec. 29, 1980 "Vertical Sync Counter Having Multi Modes of Operation For Different TV Systems"
10. 220,614 Dec. 29, 1980 "Integrator Circuit For Separating Vertical Sync Pulses"

BACKGROUND OF THE INVENTION

1. Field of the Invention

This invention relates generally to television receiver systems and, more particularly, to a method and apparatus for controlling the bandpass characteristic of the horizontal phase lock loop by altering the gain of the horizontal phase detector.

2. Description of the Prior Art

In most modern television receivers, a phase lock loop is employed to lock the horizontal oscillator in the horizontal sweep section of the receiver to the incoming separated horizontal synchronization pulses. This is done to achieve a high degree of noise immunity. In effect, the phase lock loop acts like a narrow bandpass filter centered on the horizontal frequency such that noise contamination in the separated synchronization pulse stream is rejected. Unfortunately, since the phase lock loop has a narrow bandwidth, it is characterized by a small pull-in range resulting in the possibility that pull-in (acquisition time) may be excessive. Pull-in or acquisition time refers to the time it takes the horizontal oscillator to lock onto the incoming synchronization pulse stream.

One solution to assuring proper pull-in over a full temperature range and at the same time provide a high degree of noise immunity is to employ a very stable horizontal oscillator. An alternative to this solution which enables the horizontal oscillator specification to be relaxed is to employ a phase lock loop which has two values of loop bandwidth. A first wide loop bandwidth may be used when the loop is out of lock with the synchronization pulse stream (i.e. during acquisition), and a second narrow loop bandwidth is employed when the horizontal oscillator is substantially locked onto the synchronization pulse stream. The first value yields good pull-in characteristics while the second permits the loop to have a high degree of noise immunity.

In most television receivers employing the above described switched bandwidth feature, a horizontal coincidence detector compares the phase of the horizontal synchronization pulse with that of the horizontal flyback pulse to determine if the loop is in a locked condition. That is, the output of the coincidence detector is a low voltage when the horizontal synchronization pulse is not coincident with the horizontal flyback pulse, and the output of the coincidence detector is high when the horizontal synchronization pulses and the horizontal flyback pulses are synchronized. With the aid of a comparator, the horizontal synchronization detector output voltage can be used to control the loop bandwidth in the desired manner by switching the phase detector gain.

With the trend towards a single integrated circuit chip television receiver containing a vertical coincidence detector, it is now possible to eliminate the horizontal coincidence detector since in the narrow bandwidth mode, the vertical coincidence detector gives an indication of horizontal as well as vertical lock. This would not only save semiconductor die area, but would also reduce the number of external components required.

SUMMARY OF THE INVENTION

It is an object of the present invention to provide a television receiver system which is more suitable for integration on a semiconductor chip.

It is a further object of the present invention to provide a method and apparatus for altering the bandwidth of the horizontal phase lock loop using the output of a vertical coincidence detector.

According to a first aspect of the invention there is provided an apparatus for altering the loop bandwidth of a horizontal phase lock loop in a television receiver by changing the gain of a phase detector within the phase lock loop, said television receiver receiving horizontal and vertical synchronization pulses and including a vertical countdown counter which is reset by a vertical countdown counter reset signal; comprising: first means for detecting coincidence between a predetermined state of said countdown counter and said vertical synchronization pulses; second means coupled to said first means for generating a first potential when said countdown counter is synchronized with said vertical synchronization pulses and for generating a second potential when said countdown counter is not synchronized with said vertical synchronization pulses; and switching means coupled to said second means and to said phase detector and responsive to said first and second potentials for altering the current in said phase detector to alter its gain.

According to a second aspect of the invention there is provided a method for altering the loop bandwidth of a horizontal phase lock loop in a television receiver by changing the gain of a phase detector within the phase lock loop, said television receiver receiving horizontal and vertical synchronization pulses and including a vertical countdown counter which is reset by a vertical countdown counter reset signal, comprising: detecting coincidence between a predetermined state of said countdown counter and said vertical synchronization pulses; generating a first potential when said countdown counter is synchronized with said vertical synchronization pulses; generating a second potential when said countdown counter is not synchronized with said vertical synchronization pulses; and controlling the current in said phase detector with said first and second potential to alter its gain.

The above and other objects, features and advantages of the present invention will be more clearly understood from the following detailed description taken in conjunction with the accompanying drawings, in which:

BRIEF DESCRIPTION OF THE DRAWINGS

FIG. 4 is a schematic diagram of an apparatus for altering the gain of the horizontal phase detector.

DESCRIPTION OF THE PREFERRED EMBODIMENT

Before embarking on a detailed discussion of the invention, it may be helpful to briefly review basic television principles. A complete TV picture appears on the TV screen thirty times per second. Between each picture, there is an interval during which the screen is dark. Each TV frame, however, is not projected as a complete picture but is created in sections by varying the brightness of a moving spot of light. That is, the picture tube contains an electron gun which generates an electron beam which moves very rapidly across a phosphor coated screen and, by changing its strength, different amounts of light are produced in different places. More exactly, the electron beam is focused into a fine point that moves from the upper left-hand corner in a straight horizontal line to the right side of the screen. After each movement from left to right, the beam intensity is reduced so that no light is produced during the return motion from right to left. After each line is painted, the beam is moved down a little on the tube face. While the motion of the electron beam is called "scanning," the electronic actions involved are generally referred to a "sweeping" and we speak of a horizontal sweep frequency of approximately 15,750 cycles per second.

It should be obvious that there must be some synchronization between the image seen by a remote television camera and that which is ultimately shown on the TV screen. If, for example, the receiver scans a picture in more or less than one-thirtieth of a second, the picture will appear to roll vertically. Thus, great care is taken to synchronize accurately the scanning of each line and frame. To achieve this, synchronizing signals are transmitted to the receiver with the sound and video information. In addition to providing signals which control the starting of each line, the edges of the picture must be blanked out to avoid any appearance of ragged edges, and the electron beam must turned off during the time in which it returns to its starting place. This return time is often referred to as the retrace or flyback period and is approximately 9 microseconds long for each line (the horizontal flyback), but is considerably longer for the period when the beam returns from the bottom to the top of the screen (the vertical flyback period).

Figure 1:
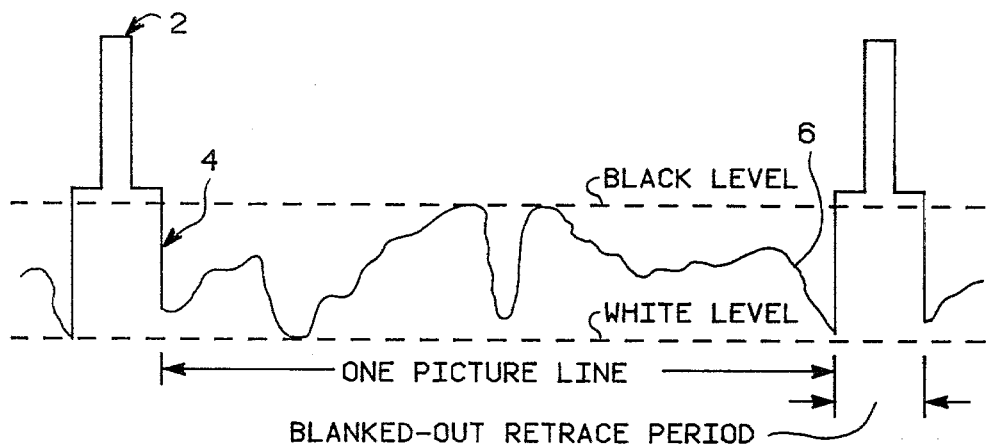
FIGS. 1 and 2 illustrate the composite video signal received by a television receiver.

FIG. 1 illustrates a black and white video signal including the horizontal synchronization pulses 2 and the horizontal blanking or flyback pulse 4. Interposed between successive flyback pulses is the actual black and white video signal 6 corresponding to one picture line. As can be seen, the horizontal flyback pulse 4 extends into the black region so that the edges of the picture are completely black avoiding the appearance of ragged edges.

Figure 2:
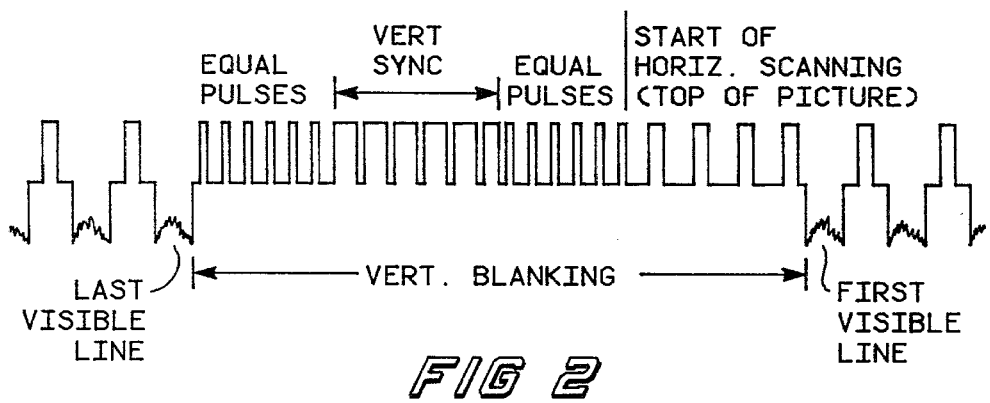

Referring to FIG. 2, the start of each field of vertical scanning is dictated by a vertical synchronization pulse which lasts much longer than the horizontal synchronization pulses. To avoid losing horizontal synchronization during the vertical flyback or blanking period, the horizontal synchronization pulses are superimposed on the vertical blanking pulse. The first six pulses are very narrow and are referred to as equalizing pulses. Next, there are periods of six wide pulses which comprise the actual vertical synchronization pulse serrated by the horizontal synchronization period. This is followed by an additional six equalizing pulses and then four regular horizontal synchronizing pulses that start the top of the picture. Note that the vertical blanking period extends through this time and darkens the screen while the beam moves from bottom to top and covers the first four lines of the picture.

Figure 3:
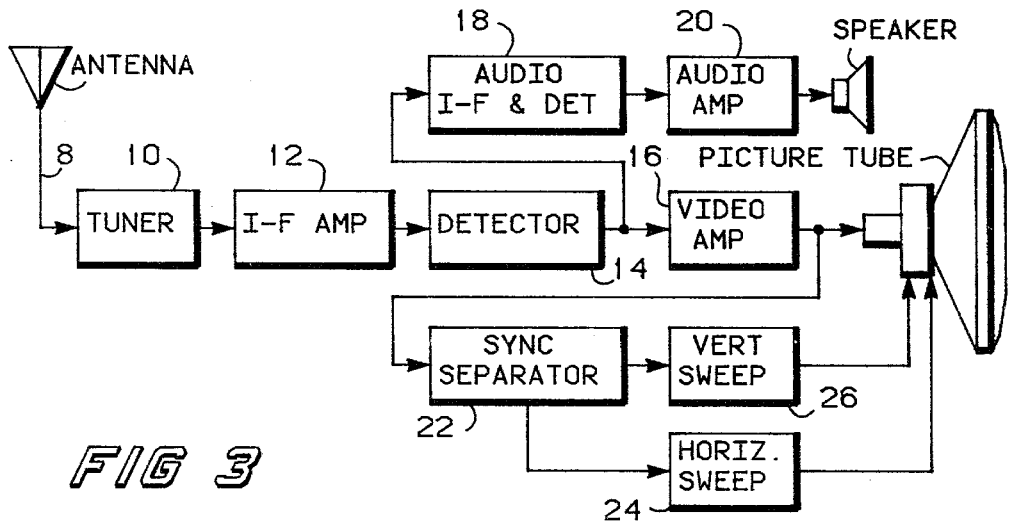
FIG. 3 is a block diagram of a basic prior art television receiver.

FIG. 3 is a block diagram of a basic black and white TV receiver. From the antenna, a transmission line 8 brings all signals received by the antenna to tuner 10 whose function it is to select the desired band of frequencies and reject all others. The tuner passes only the desired intermediate frequency to the IF amplifiers 12.

Television IF amplifiers 12 include a plurality of IF stages which amplify the IF signals. To prevent overloading and to minimize picture changes during fading, automatic gain control is used to control the amplification of the IF signal.

The output of IF amplifiers 12 is applied to a detector 14 which removes the amplitude modulated video signal and applies it to video amplifier 16. The sound signal is removed, amplified, clipped, and limited in audio section 18. The output of audio detector 18 is applied to audio amplifier 20 which is similar to audio amplifiers found in radio receivers. The output of the audio amplifier is applied to the speaker.

Video amplifier 16 requires more bandwidth than audio amplifier 20. This is accomplished using special peaking circuits for the high and low frequency response. The output of video amplifier 16 is applied to the picture tube and to a sync separator 22 which is unique to television receivers. As described earlier, the horizontal and vertical synchronization pulses appear on top of their respective blanking signals which are sandwiched in between lines of picture signal. The sync operator clips the synchronization pulses off the composite video signal after the signal has been amplified in video amplifier 16. Two separate filters may be employed to separate the vertical from the horizontal synchronization pulses. For example, a high pass filter would permit only the horizontal synchronization pulses to reach horizontal sweep section 24 while the vertical pulses could be passed through a low pass filter to the vertical sweep section 26.

The vertical sweep section generates the actual signals which pass through the deflection yoke of the picture tube to move the electron beam up and down. Similarly, the horizontal sweep section is responsible for moving the electron beam across the tube. In order to obtain the large current of short duration required in the horizontal deflection coils, a transformer is generally used. Furthermore, a flyback transformer is generally considered part of the horizontal sweep section. This transformer generates a high voltage during the time in which the electron beam returns from right to left.

Keeping the above basic television principles in mind, copending U.S. patent application Ser. No. 220,607, Dec. 29, 1980 entitled "Large Scale, Single Chip Integrated Circuit Television Receiver Subsystem" and filed of even date herewith describes a VLSI single chip television receiver which incorporates in the vertical sweep section a vertical countdown counter which counts pulses from the horizontal oscillator so as to keep track of the number of lines in a complete picture frame (525 lines in the United States and 625 lines in Europe). This counter resets and begins counting again upon receipt of a vertical synchronization pulse or, in the absence of a vertical synchronization pulse, upon a pre-selected count of the counter. If the occurrence of the vertical synchronization pulse is coincident with a predetermined time window determined by the countdown counter, then the picture being received is in synchronization with that which is being transmitted. If the vertical pulse does not occur within the prescribed time window, then the TV picture is out of sync. A more detailed discussion of the vertical countdown counter and the means by which it is reset may be found in copending U.S. patent application Ser. No. 220,610 filed Dec. 29, 1980 entitled "Vertical Sync Counter Having Multi Modes of Operation For Different TV Systems" and filed of even date herewith. This process is referred to as vertical countdown coincidence detection.

FIG. 4 is a schematic diagram of an apparatus for switching the horizontal phase detector gain in accordance with the result of the vertical countdown coincidence detection process so as to provide for variations in the phase lock loop bandwidth depending upon whether or not the system is in or out of lock. That is, the phase lock loop should have a wide loop bandwidth when the loop is out of lock and a narrow loop bandwidth when the horizontal synchronization pulse stream has been acquired.

The logic elements shown in FIG. 4 correspond to I²L logic elements. The above referred to vertical countdown counter reset signal (CR) is applied to inverting gate 30 which has a first output coupled to the input of inverter 32 and a second output coupled to node 34. Node 34 also receives a slot signal which corresponds to count interval 524½ to 526½ of the vertical countdown counter. Node 34 is coupled to the input of inverting gate 36. The output of gate 36 is coupled to an input of inverting gate 38 which has a first input coupled to node 40 and a second input coupled to a one pulse delay 42 the output of which is also coupled to node 40. Node 40 is coupled to the input of inverting gate 44. The output of gate 44 is coupled to the input of inverting gate 46 which has first, second and third outputs each one coupled to the reset input of first, second and third flip-flops 48, 50 and 52 respectively.

The output of gate 32 and a first output of gate 54 are coupled to node 56 which is in turn coupled to the clock input of flip-flop 48. The clock input is designated C so as to indicate that the flip-flop switches on the trailing edge of the applied clock pulse. The Q output of flip-flop 48 is applied to the clock input of flip-flop 50, and the Q output of flip-flop 50 is applied to the clock input of 52. Thus, flip-flops 48, 50 and 52 comprise a three bit binary counter which is capable of counting eight distinct states. The Q outputs of flip-flops 48, 50 and 52 are coupled together and applied to the input of gate 54. The second output of gate 54 is applied to the input of inverter 58 which in turn has an output coupled to the gated horizontal phase detector 60.

Phase detector 60 includes transistors 62, 66, 72, 74, 76, and 80, resistors 68 and 70, and diode 78. Transistor 62 acts as a switch and has a base electrode coupled to the horizontal synchronization pulse, an emitter coupled to ground and a collector coupled to node 64. Node 64 is coupled to node 82 on the one hand via resistor 68 and on the other hand via resistor 70 and the collector-emitter path of transistor 66. Transistor 72 has an emitter coupled to node 82, a collector coupled to node 84 and a base coupled to a bias voltage ($V_{BIAS}$). Node 84 is coupled to the emitters of transistors 74 and 76 which in turn have base electrodes coupled to the bias voltage ($V_{BIAS}$) and the output of the horizontal oscillator respectively. The collectors of transistors 74 and 76 are coupled to a turnaround circuit which includes transistor 80 and diode 78 as shown in FIG. 4.

As should be apparent, if a horizontal sync pulse occurs and the output of gate 58 is low, then transistor 62 is on and transistor 66 is off. Thus, the current through the phase detector is approximately the bias voltage ($V_{BIAS}$) divided by the resistance of resistor 68 ignoring the saturation voltage drop in transistor 62. If, on the other hand, the output of gate 58 is high, transistor 66 is turned on. Now, the current through the phase detector equals the bias voltage divided by the resistance of resistor 68 plus the bias voltage divided by the resistance of resistor 70 ignoring the saturation voltage drop of transistors 62 and 66. It can thus be readily seen that when the output of gate 58 is high, the current through the gated phase detector has been increased thus increasing its gain. As a result, the bandwidth of the horizontal phase lock loop has been increased. Thus, when the vertical coincidence detector is out of lock, the desired output of gate 58 is a high voltage. A low voltage should appear at the output of gate 58 if an in-lock status has been detected.

The operation of the circuit will now be described to illustrate how the proper output from gate 58 is achieved. The vertical countdown counter reset signal (CR) is applied to the input of inverting gate 30. Vertical coincidence exists when the high state at the output of gate 30 applied to node 34 overlaps the window signal (524 and one-half to 526 and one-half) also applied to node 34. During such coincidence period a high will appear at the input of gate 36. The output of gate 30 is also applied to the input of gate 32.

With the output of gate 30 overlapping the window signal at node 34, a low voltage will appear at the output of gate 36 causing a high voltage to appear at the first and second outputs of gate 38. The first output of gate 38 is applied to node 40 while the second output is applied to one pulse delay 42. The one pulse delay may comprise nothing more than a flip-flop. After two successive indications of coincidence, both the output of gate 38 and the output of the one pulse delay which is also applied to node 40 will be a "1." Since both signals being applied to node 40 are now high, the output of gate 44 will go low causing the first, second and third outputs of gate 46 to go high. The first, second and third outputs of gate 46 are applied respectively to first, second and third reset inputs of flip-flops 48, 50 and 52 causing their respective Q outputs to go low. A low at the output of any one of the three counter flip-flops applied to the input of gate 54 will cause a high to appear at the first and second outputs of gate 54. One of these outputs is applied back to node 56 and since the output of gate 32 is also high, a signal will appear at the clock input of flip-flop 48 which would tend to increment it. However, the high signal appearing at its reset input will override the incrementing function maintaining the output of gate 54 high. The output of gate 54 being high will cause a low to appear at the output of gate 58. This causes a reduced current to flow through the phase detector as described above which is the desired case since coincidence has been detected.

Should the counter reset signal fail to overlap the decode slot at the input of gate 36, a high will appear at the output of gate 36 causing a low to appear at the first and second outputs of gate 38. This low applied to node 40 will cause the output of gate 44 to go high and the first, second and third outputs of gate 46 to go low removing the reset signal from the counter flip-flops. The counter flip-flops are now free to increment for each count or reset signal received which do not overlap the decode slot. If eight non-overlapping reset signals are received without the occurrence of two overlapping reset signals, the counter will increment until the Q output of each of the three flip-flops is high. When all three outputs are high, the output of gate 54 will go low causing the output of gate 58 to go high. This causes the current through the phase detector to increase as described earlier thus increasing its gain. Since the output of gate 54 has gone low, and since this output is applied to node 56 which is in turn coupled to the clock input of the first counter flip-flop 48, no additional counting will take place.

In summary, the gain of the horizontal phase detector is increased or decreased depending upon whether or not the countdown counter is locked to the incoming vertical synchronization pulse. When locked, the gain of the phase detector is decreased which in turn narrows the bandpass characteristic of the horizontal phase lock loop to provide good noise immunity. On the other hand, when out of lock, the gain is increased increasing the bandpass characteristic to provide improved pull-in time.

The invention has been described with reference to a specific embodiment thereof. Changes in form and details may be made by one skilled in the art without departing from the scope of the invention as defined by the appended claims. For example, while the circuit of FIG. 2 is shown as being implemented with I²L logic, it could have just as well been implemented with ECL, TTL or MOS devices.

I claim:

1. An apparatus for altering the loop bandwidth of a horizontal phase lock loop in a television receiver by changing the gain of a phase detector within the phase lock loop, said television receiver receiving horizontal and vertical synchronization pulses and including a vertical countdown counter which is reset by a vertical countdown counter reset signal; comprising:
    first means for detecting coincidence between a predetermined state of said countdown counter and said vertical synchronization pulses;
    second means coupled to said first means for generating a first potential when said countdown counter is synchronized with said vertical synchronization pulses and for generating a second potential when said countdown counter is not synchronized with said vertical synchronization pulses; and
    switching means coupled to said second means and to said phase detector and responsive to said first and second potentials for altering the current in said phase detector to alter its gain.

2. An apparatus according to claim 1 wherein said first potential causes said current to assume a first value and said second potential causes said current to assume a second higher value to increase the gain of the phase detector.

3. An apparatus according to claim 2 wherein said second means includes:
    counting means for incrementing each time said countdown counter is out of synchronization with said vertical synchronization pulses;
    third means coupled to said counting means for generating said second potential when said counting means reaches a predetermined state and for generating said first potential when said counting means is not in said predetermined state; and
    reset means coupled to said first means and to said counting means for resetting said counting means with a reset signal when said countdown counter is synchronized with said vertical synchronization pulses.

4. An apparatus according to claim 3 wherein said reset means include means for detecting a predetermined number of successive occurrences of coincidence before generating said reset signal.

5. An apparatus according to claim 4 wherein said counting means is a three bit binary counter and wherein said predetermined number is two.

6. A method for altering the loop bandwidth of a horizontal phase lock loop in a television receiver by changing the gain of a phase detector within the phase lock loop, said television receiver receiving horizontal and vertical synchronization pulses and including a vertical countdown counter which is reset by a vertical countdown counter reset signal, comprising:
    detecting coincidence between a predetermined state of said countdown counter and said vertical synchronization pulses;
    generating a first potential when said countdown counter is synchronized with said vertical synchronization pulses;
    generating a second potential when said countdown counter is not synchronized with said vertical synchronization pulses; and
    controlling the current in said phase detector with said first and second potential to alter its gain.

7. A method according to claim 6 wherein said first potential causes the current in said phase detector to assume a first value and wherein said second potential causes the current in said phase detector to assume a second higher value to increase the gain of the phase detector.

8. A method according to claim 7 further including:
    incrementing a counter each time said countdown counter is out of synchronization with said vertical synchronization pulses;
    generating said second potential when said counting means reaches a predetermined state;
    generating said first potential when said counting means is not in said predetermined state; and
    resetting said counting means when said countdown counter is synchronized with said vertical synchronization pulses.

9. A method according to claim 8 including detecting a predetermined number of successive occurrences of coincidence before resetting said counting means.

* * * * *